United States Patent
Cook et al.

(10) Patent No.: US 12,489,829 B1
(45) Date of Patent: Dec. 2, 2025

(54) CACHING FRAMEWORK TO INCREASE RESILIENCE TO NETWORK INSTABILITY

(71) Applicant: Palantir Technologies Inc., Denver, CO (US)

(72) Inventors: Christopher Cook, Porirua (NZ); David Skiff, Iowa City, IA (US); Drew Thoennes, New York, NY (US); Jack Grossman, Arlington, VA (US); Gautam Punukollu, New York, NY (US); Gabriel Boning, Seattle, WA (US); In Hwa Kang, Jersey City, NJ (US); Ji Young Ohn, Mountain View, CA (US); Nikita Morozov, Richmond, VA (US); Noah Öhrner, London (GB); Peter Goldberg, Arlington, VA (US); Shelby Pefley, Brooklyn, NY (US); Westin Miller, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 34 days.

(21) Appl. No.: 18/416,500

(22) Filed: Jan. 18, 2024

Related U.S. Application Data

(60) Provisional application No. 63/439,858, filed on Jan. 18, 2023.

(51) Int. Cl.
*G06F 15/173* (2006.01)
*H04L 9/40* (2022.01)
*H04L 41/0806* (2022.01)
*H04L 67/568* (2022.01)

(52) U.S. Cl.
CPC ........ *H04L 67/568* (2022.05); *H04L 41/0806* (2013.01); *H04L 63/105* (2013.01)

(58) Field of Classification Search
CPC .. H04L 67/568; H04L 41/0806; H04L 63/105
USPC ........................................................ 709/225
See application file for complete search history.

(56) References Cited

U.S. PATENT DOCUMENTS

| | | | | |
|---|---|---|---|---|
| 6,151,630 A * | 11/2000 | Williams | ............... | G06F 16/957 709/227 |
| 7,266,645 B2 * | 9/2007 | Garg | ..................... | G06F 16/275 714/6.1 |
| 7,548,982 B2 * | 6/2009 | Gu | ...................... | G06F 16/9574 709/228 |
| 7,610,357 B1 * | 10/2009 | Chandrachood | ...... | H04L 41/147 709/219 |
| 7,895,530 B2 * | 2/2011 | Leavitt | ................... | B60K 35/21 715/810 |
| 8,209,548 B2 * | 6/2012 | Botzum | .................. | G06F 21/62 713/193 |
| 8,560,653 B2 * | 10/2013 | Herrod | .................... | H04L 41/04 709/223 |

(Continued)

*Primary Examiner* — Alicia Baturay
(74) *Attorney, Agent, or Firm* — Sheppard Mullin Richter & Hampton LLP

(57) ABSTRACT

Computing systems methods, and non-transitory storage media are provided for obtaining a request or query indicative of a resource, tool, task, or workflow, determining any entities including data, logic, dependencies and libraries, within a remote server, corresponding to the resource, tool, task, or workflow, and selectively provisioning or caching, from the remote server, the entities at the computing system.

17 Claims, 12 Drawing Sheets

(56) References Cited

U.S. PATENT DOCUMENTS

| | | | | |
|---|---|---|---|---|
| 8,898,798 | B2* | 11/2014 | Rogers | G06Q 10/10 |
| | | | | 726/28 |
| 9,081,682 | B2* | 7/2015 | Lipchuk | G06F 12/08 |
| 9,262,323 | B1* | 2/2016 | Shankaran | G06F 12/0868 |
| 9,288,231 | B2* | 3/2016 | Reddy | H04L 63/20 |
| 9,471,050 | B2* | 10/2016 | Tilley | H02S 20/10 |
| 9,509,529 | B1* | 11/2016 | McAllister | H04L 51/226 |
| 9,953,052 | B1* | 4/2018 | Hill | G06F 16/23 |
| 10,095,625 | B2* | 10/2018 | Izawa | G06F 12/0866 |
| 10,122,665 | B2* | 11/2018 | Beausoleil | H04L 51/42 |
| 10,318,474 | B1* | 6/2019 | Krasner | G06F 13/1663 |
| 10,319,467 | B2* | 6/2019 | Rogers | G16H 10/60 |
| 10,437,209 | B2* | 10/2019 | Tilley | H02S 20/32 |
| 10,491,698 | B2* | 11/2019 | Agarwal | H04L 67/55 |
| 10,762,160 | B2* | 9/2020 | Yanagihara | H04L 67/568 |
| 11,003,583 | B2* | 5/2021 | Mckean | G06F 11/3457 |
| 11,539,542 | B2* | 12/2022 | Tiwari | H04N 7/15 |
| 11,880,467 | B2* | 1/2024 | Wilczynski | G06F 21/6209 |
| 12,113,720 | B2* | 10/2024 | Eldering | H04L 51/216 |
| 12,248,530 | B2* | 3/2025 | Ding | G06F 16/221 |
| 2007/0234224 | A1* | 10/2007 | Leavitt | G06F 1/1626 |
| | | | | 715/765 |
| 2010/0049879 | A1* | 2/2010 | Leavitt | G06F 1/169 |
| | | | | 710/14 |
| 2017/0041429 | A1* | 2/2017 | Gibson | H04W 4/023 |
| 2019/0173976 | A1* | 6/2019 | Bendapudi | G06F 21/335 |
| 2022/0171868 | A1* | 6/2022 | McCuen | G06F 9/45558 |
| 2024/0281551 | A1* | 8/2024 | McCuen | G06F 21/6218 |
| 2024/0394021 | A1* | 11/2024 | Bhargava | G06F 8/36 |

* cited by examiner

CACHING FRAMEWORK TO INCREASE RESILIENCE TO NETWORK INSTABILITY

CROSS REFERENCE TO RELATED APPLICATION

This application claims the benefit under 35 U.S.C. 119 (e) of U.S. Provisional Application No. 63/439,858, filed Jan. 18, 2023, the content of which is hereby incorporated in its entirety.

BACKGROUND

During periods of intermittent network connectivity or network instability, access to resources or tools such as data, assets including code and logic, and ontology-based features increase the ability to perform computing functions in a wide variety of environments and scenarios. However, downloading or transferring an entire platform may be infeasible for typical computing devices due to the immense storage and processing footprints. Therefore, provisioning of resources or tools to computing devices typically involves consideration of storage and processing limitations of the computing devices.

SUMMARY

Various examples of the present disclosure can include computing systems, methods, and non-transitory computer readable media configured to perform: obtaining a request or query indicative of a resource, tool, task, or workflow; determining any entities including data, logic, dependencies and libraries, within a remote server, corresponding to the resource, tool, task, or workflow; and selectively provisioning or caching, from the remote server, the entities at a computing system.

In some examples, the determining of any entities includes mapping the resource, tool, task, or workflow to any data, logic, dependencies, and libraries. In some examples, the determining of any entities includes a semantic translation from the resource, tool, task, or workflow to any data, logic, dependencies, and libraries.

In some examples, the determining of any entities is based on a historical frequency of utilization of any entities related to the resource, tool, task, or workflow. For example, the frequency of utilization may be related to a specific user. The computing systems may further be configured to perform, tracking or detecting the historical frequency of utilization of any entities related to the resource, tool, task, or workflow.

In some examples, the data includes a data object. The logic includes ontology or configuration features to render the data. The logic also includes front-end assets, such as JavaScript assets.

In some examples, the selectively provisioning or caching the entities includes storing the entities for a threshold period of time at the computing system.

In some examples, the selectively provisioning or caching the entities includes setting an access control level of each of the cached entities within the computing system equivalent to an access control level at which the entities were retrieved from the remote server.

In some examples, the setting of the access control level of caching includes, retrieving two entities at a common access control level different from an actual access control level of one of the entities; and the setting of the access control level of each of the cached entities within the computing system is equivalent to the common access control level.

In some examples, the computing systems are further configured to perform: detecting a network disconnection within the computing system; in response to detecting the network disconnection, queueing any modifications to the data to be uploaded to the remote server upon a network reconnection.

In some examples, upon the network reconnection, a vector clock of the remote server, indicating a most recent revision prior to the disconnection, is updated if the vector clock of the remote server represents an earlier time compared to a vector clock of the computing system indicating a write operation at the computing system during the network disconnection.

In some examples, the entities include front-end entities and exclude back-end entities. For example, front-end entities may include processed and/or transformed data from an original database or original data source, while the back-end entities include the original database or the original data source. Front-end entities may include thumbnails and condensed versions of data rather than the original source data.

These and other features of the computing systems, methods, and non-transitory computer readable media disclosed herein, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings. Any principles or concepts illustrated in one figure may be applicable to any other relevant figures. For example, principles illustrated in FIG. 1 may also be applicable to any of FIGS. 2, 3A, 3B, 4, 5, 6, 7, 8, and 9, and vice versa.

DETAILED DESCRIPTION

In some current implementations, when a connection to a remote server is lost, functionalities of a computing device, such as reading, tracking, monitoring, or viewing information that is otherwise stored on the remote server, may be compromised if relevant resources are not cached on the computing device. On the other hand, caching, copying, or provisioning an entire remote server within a computing device may be infeasible due to the immense storage and processing footprint which would overwhelm the computing device. Therefore, selectively caching functionalities or resources would balance considerations of preparing for potential downtime of a network under austere conditions or unpredictable attacks while eliminating or mitigating loss of functionalities, without overloading the computing device due to excessive storage. In such a manner, situational and contextual awareness may still be maintained even during network downtime.

In some examples, the functionalities or resources to be cached onto the computing device may include data (e.g., front-end data), for example, in an object or object-based format, in a tabular format, or any other format or manifestation, logic, assets (e.g., JavaScript and/or front-end assets), tools (e.g., databases), applications, tracks (e.g., from over-the-air sources such as Automatic Depending Surveillance-Broadcast (ADS-B) and Automatic Identification System (AIS)), libraries, dependencies, and/or configuration related features such as an ontology. In some examples, the functionalities or resources to be cached may be set or inputted by a user of the computing device, and/or an administrator. In some examples, the functionalities or resources to be cached may be determined or semantically deciphered or translated by the computing device. The determination of the functionalities or resources may be based on a current and/or predicted job (e.g., a planned navigation or expedition), task, or workflow, functionalities or resources that have historically been cached, functionalities or resources cached by one or more other computing devices, and/or one or more current and/or predicted environmental conditions (e.g., weather, visibility, terrain).

Figure 1:
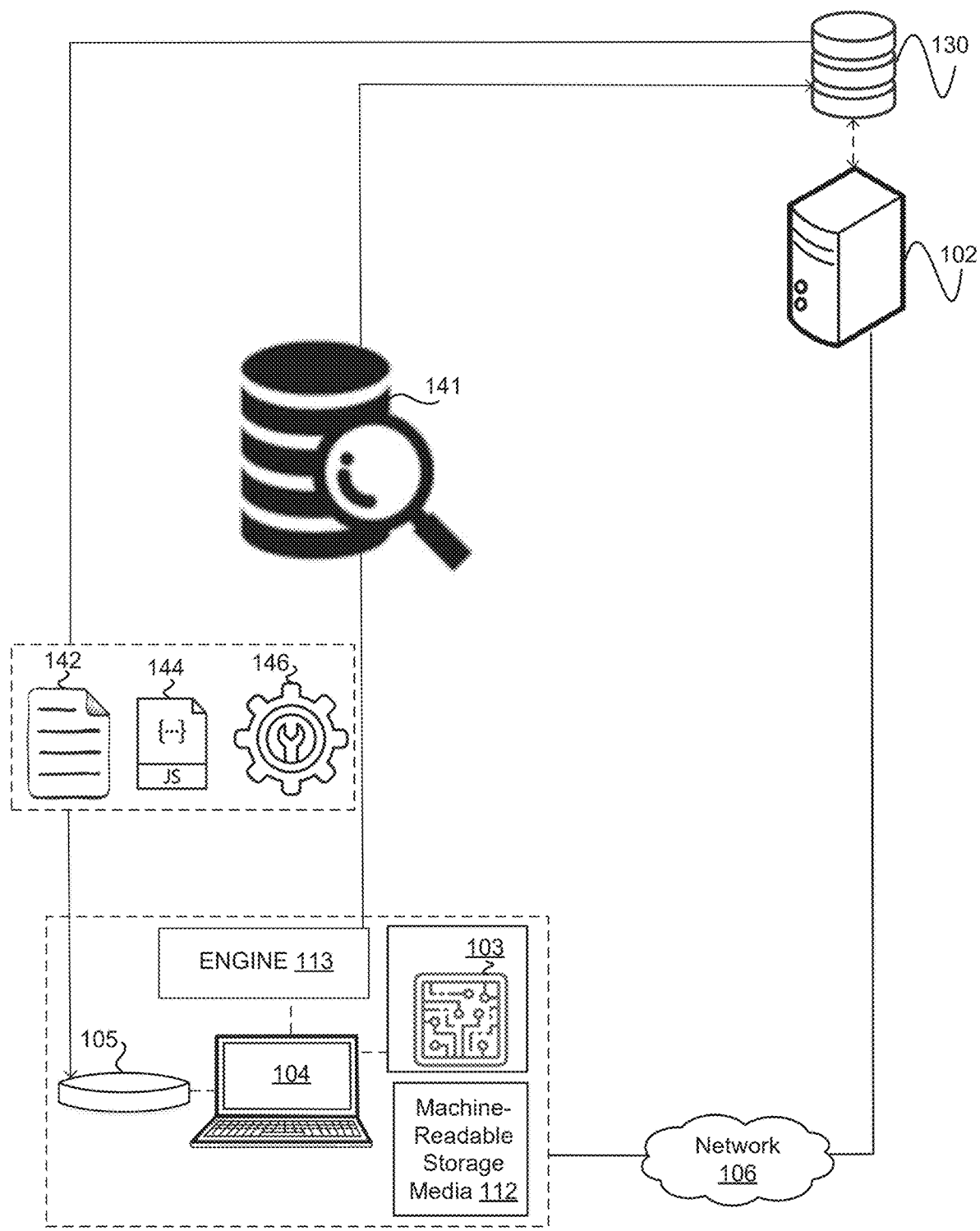
FIG. 1 illustrates an example implementation, in accordance with various examples, of a computing system that performs selective caching from a remote server.

FIG. 1 illustrates an example implementation, in accordance with various examples, of a computing device or system (hereinafter "computing device") 104 that selectively caches functionalities, resources, and/or artifacts from a remote server (e.g., a server 130). The computing device 104 may be, for example, a client device. The server 130 may be stored within, associated with, and/or controlled by one or more processors 102. Although only the single computing device 104 is illustrated, any number of computing devices within any number of different networks may selectively cache functionalities or resources from the server 130. The other computing devices may be implemented in a same or similar manner as the computing device 104.

The computing device 104 may be operated by an entity such as a user. The user may submit a request or query (hereinafter "query") 141 through the computing device 104. Such a request or query may relate to one or more functionalities or resources to be cached or provisioned (hereinafter "cached") into the computing device 104 from the server 130. The request or query may directly indicate or stipulate one or more functionalities or resources, such as a map, a data object, an electronic radio, or chat application. Additionally or alternatively, the request or query may indicate or stipulate a current and/or scheduled operation (e.g., processing, analysis, alerting, reading, writing), job, task, or workflow. In general, the computing device 104 can interact with the one or more processors 102 and/or the server 130 over a network 106, for example, through one or more graphical user interfaces, application programming interfaces (APIs), and/or webhooks.

The computing device 104 may include one or more processors 103 (e.g., hardware and/or virtual processors) which may be configured to perform various operations by interpreting machine-readable instructions, for example, from a machine-readable storage media 112. In some examples, one or more of the processors 103 may be combined or integrated into a single processor, and some or all functions performed by one or more of the processors 103 may not be spatially separated, but instead may be performed by a common processor. The processors 103 may further be connected to, include, or be embedded with one or more engines 113 (hereinafter "engine 113") which, for example, may include protocol or logic that is executed to carry out the functions of the processors 103. In general, the engine 113 may be implemented, in whole or in part, as software and/or firmware that is capable of running on the computing device 104, and may be read or executed from the machine-readable storage media 112. The engine 113 may include, as nonlimiting examples, parameters, expressions, functions, arguments, evaluations, conditions, and/or code. Here, in some examples, the engine 113 encompasses functions of or related to selective caching of functionalities or resources from the server 130 to the computing device 104, and in particular, a storage 105 associated with the computing device 104. The functionalities or resources may include data 142, manifested in an object format, a tabular format, a relational format, unstructured data, structured data, and/or other formats, assets 144 (e.g., JavaScript and/or front-end assets, which may include logic and/or libraries), and configuration related features 146 which may include ontological libraries or features to render data and/or an application. The engine 113 may implement or perform operational transform (OT) writeback features to write data or modifications to data from the computing device 104 back to the server 130, for example, during network connectivity or reconnection. In some examples, upon the network reconnection, a vector clock of the server 130, indicating a most recent revision prior to the disconnection, is updated if the vector clock of the server 130 represents an earlier time compared to a vector clock of the computing device 104 indicating a write operation at the computing device 104 during the network disconnection.

The server 130 may include or store, or be capable of obtaining, receiving, or retrieving, functionalities or resources related to different workflows, platforms, and/or tasks, such as sensing, tracking, rendering, communicating, and/or writing, and/or different features such as maps, communication channels such as chat, software defined radios, interfaces, and/or sensors. These functionalities, resources and/or features may be cached into the computing device 104.

The server 130 may store one or more versions of the functionalities, resources or features. For example, the server 130 may store one or more compressed versions, which consume less storage resources compared to the full versions, as additional options for caching into the computing device 104. The server 130 may store times or timestamps associated with the versions. In some examples, the server 130 may include metadata, for example, which may include any paths (e.g., host paths or directory paths) and/or security or access control attributes of the functionalities, resources or features.

The engine 113 may receive the query 141 and either directly cache one or more functionalities or resources from the server 130 into the storage 105, and/or decipher or translate, semantically, the query 141 to interpret or determine one or more functionalities or resources, or bundles of functionalities or resources, to be cached. In some examples, the engine 113 may cache resources from different types of hardware such as Internet of Things (IoT) devices, sensors, and/or navigation assets such as aerial assets.

For example, if the query 141 indicates a map, a software defined radio, or an analysis operation, the engine 113 may translate or map such an indication to one or more stored functionalities or resources, or bundles, to be cached from the server 130. For example, as will be further elucidated in the foregoing figures, the engine 113 may determine any requisite, associated, or dependent components of a map, such as feeds, objects, and/or tiles.

In some examples, the engine 113 may receive a query indicating a scheduled process, workflow, mission, or expedition, prompt selection of, and/or receive or determine a selection of tiles, layers (e.g., weather condition, boundaries of geofences and other demarcations, and particular sites or destinations), maps (e.g., annotations, polygons) and/or tools to cache.

In some examples, the engine 113 may infer one or more functionalities, resources or bundles based on current and/or scheduled workflows or tasks. For example, if a mapping or excavation expedition is scheduled, the engine 113 may infer that a high definition (HD) map, and any requisite, associated, or dependent components thereof, are to be cached in the storage 105. As another example, if the engine 113 determines or predicts inclement weather conditions, such as low visibility conditions, the engine 113 may determine or predict that additional sensor functionalities or resources are to be cached in the storage 105. As another example, the engine 113 may determine or predict one or more functionalities or resources to be cached based on a type of conveyance or instrument associated with the computing device 104. For example, if the computing device 104 is associated with or part of a vehicle, then the engine 113 may determine or predict one or more functionalities or resources that are appropriate for the vehicle. In particular, if the computing device 104 is associated with an airplane, then a first bundle which may contain airborne sensor information may be cached into the storage 105. However, if the computing device 104 is associated with a land vehicle, then a second bundle which may contain ground sensor information may be cached into the storage 105. As another example, the engine 113 may determine or infer whether to cache a full version or a compressed version of a functionality (e.g., a full version of a map or a compressed version of a map which may have lower resolution and/or fewer pixels) based on a remaining available storage within the computing device 104 and/or historical utilization levels of one or more features within the computing device 104 overall or as specifically pertaining to a given workflow or task. As another example, the engine 113 may determine or infer one or more functionalities, resources or bundles to be cached based on a status of one or more other computing devices. For example, if the computing device 104 is within a cluster, such as a distributed cluster collaborating on a task, if one or more other computing devices are assigned to a first task, then the engine 113 may determine to cache, at the storage 105, functionalities or resources that correspond to, or are mapped to, a second task, which may be complementary, upstream, and/or downstream of the first task. Alternatively, the engine 113 may determine to cache functionalities or resources that match those that were cached at other computing devices.

Figure 2:
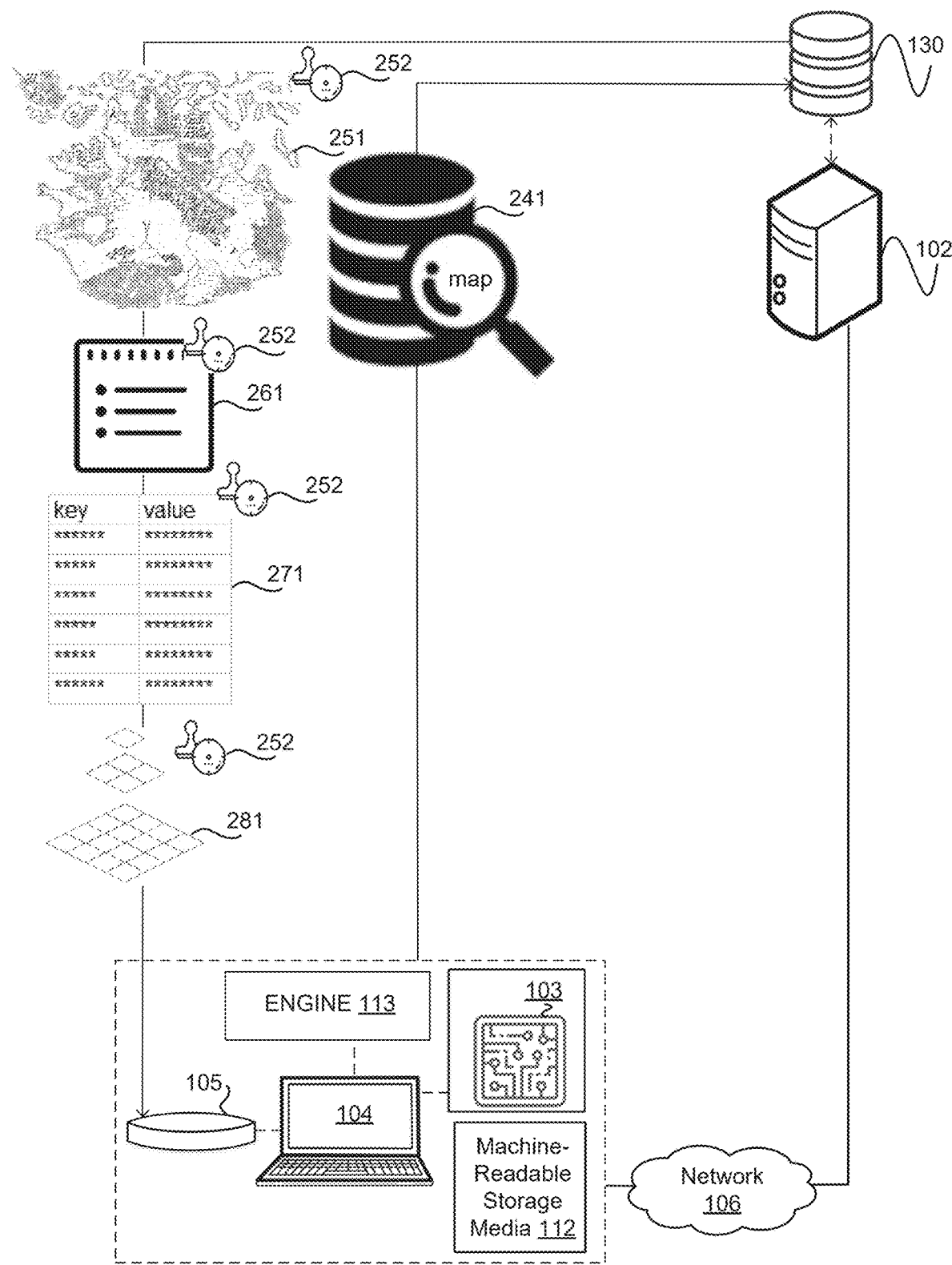
FIG. 2 illustrates an example implementation, in accordance with various examples, of a computing system that caches resources related to a map query.

FIG. 2 illustrates an exemplary implementation of a computing system that caches resources related to a map query. In FIG. 2, the computing device 104 may output or indicate a query 241, which may be for a map. The engine 113 may infer or determine specific functionalities or resources relevant to, or corresponding to, the query 241. This inference or determination may encompass translating or mapping the query 241 into one or more bundles (e.g., functionalities or resources to be retrieved that are directed to, or pertain to, a map). The inference or determination may be general to computing devices or specific to the computing device 104. For example, the inference or determination may be based on frequencies of usage of the different functionalities or resources of the map, such as a number of times an artifact (e.g., data or application) was accessed or utilized, extent of access or utilization, and/or processing power consumed in accessing or utilizing the artifact. In such a scenario, the engine 113 may infer or determine to cache artifacts that are among most frequently accessed or utilized, and/or that consume among highest amounts of processing power in accessing or utilizing the artifact.

Here, in FIG. 2, the engine 113 may determine or infer that the query 241 corresponds to a bundle including a map 251, one or more feeds 261, one or more objects 271 which include key-value pairs, and one or more tiles 281. Thus, the computing device 104 may simply query for an entity (e.g., a map) without specifying constituents (e.g., feeds, objects, and tiles), applications, resources, or dependencies of the entity. The engine 113 may semantically translate the query 241 to determine other entities or artifacts that are implied by and/or encompassed within the query 241, so that the map 251 would not be the only entity provided, but also any tools, artifacts, applications, logic, other functionalities or resources to utilize the map. In some examples, the engine 113 may determine any additional functionalities or resources to be cached based on environmental conditions. For example, during current or predicted inclement conditions (e.g., visibility of below a threshold level, and/or precipitation above a threshold level), the engine 113 may determine to additionally cache other functionalities or resources such as sensing features that would augment features of a map, and/or select a map having a higher level of granularity to cache. In some examples, the engine 113 may selectively adjust a granularity of a map to be cached based on a level of visibility and/or other environment condition, and/or select, from different maps having different granularity levels, a particular map of a particular granularity level based on the level of visibility and/or other environment condition.

Each entity within the bundle may be associated with one or more access control attributes (e.g., parameters and/or levels). The access control attributes under which each entity is cached may match access control attributes at which each entity is retrieved, which may be different from (e.g., at a same access control level or a higher access control level compared to) access control attributes under which each entity is stored within the server 130. In some examples, any entities that were retrieved simultaneously, grouped under a common query, and/or packaged within a common bundle, may be cached with same access control attributes. For example, in FIG. 2, the map 251, the one or more feeds 261, the one or more objects 271, and the one or more tiles 281 may be retrieved simultaneously from the server 130, grouped under the query 241, and/or packaged within the common bundle corresponding to the query 241, and have access control attributes 252. For example, the access control attributes may indicate that the map 251, the one or more feeds 261, the one or more objects 271, and the one or more tiles 281 have access control levels of "secret," which may be different from at least some of the access control levels under which the map 251, the one or more feeds 261, the one or more objects 271, and the one or more tiles 281 are stored in the server. In some examples, any of the map 251, the one or more feeds 261, the one or more objects 271, and the one or more tiles 281 may be cached under different access control attributes if they are retrieved separately. For example, if the one or more feeds 261 are to be cached at an access control level of "unclassified" rather than "secret," then the one or more feeds 261 may be retrieved at a different time compared to the map 251, the one or more objects 271, and the one or more tiles 281.

Figure 3A:
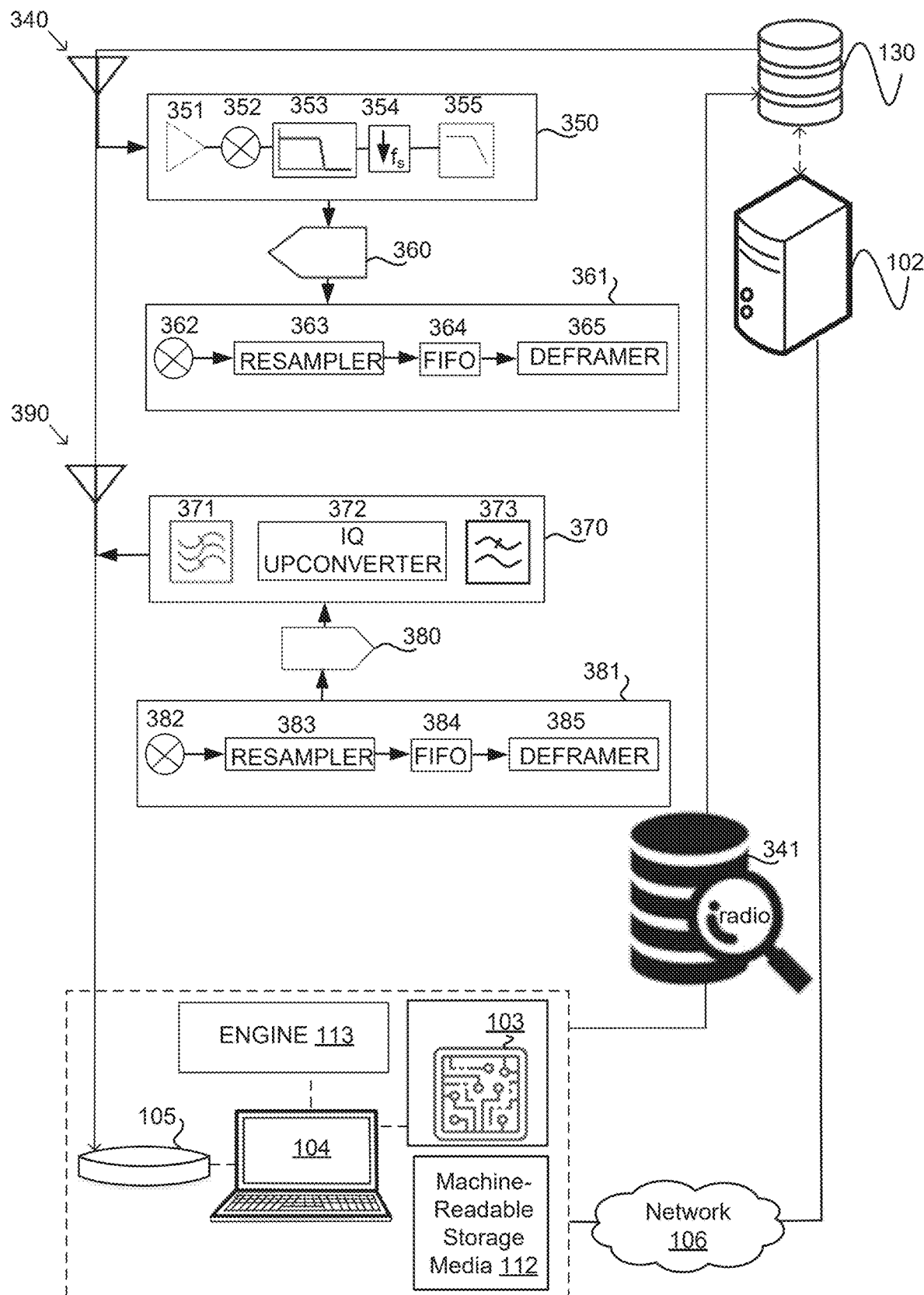
FIG. 3A illustrates an example implementation, in accordance with various examples, of a computing system that caches resources related to a software defined radio.

FIG. 3A illustrates an exemplary implementation of a computing system that caches resources and/or functionalities in response to a query 341 specifying a software defined radio. In particular, the engine 113 may determine constituents or individual components, at different granularity or specificity levels (e.g., components, subcomponents, subcomponents of subcomponents), of a software defined radio, and provision or cache these constituents, even without being specified by the query 341. In FIG. 3A, the engine 113 may determine the constituents to include, for example, a receiver 340 and a transmitter 390. The receiver 340 may include a radio front-end 350 and a digital back-end 361, while the transmitter 390 may include a radio front-end 370 and a digital back-end 381. In particular, the radio front-end 350 may include an amplifier 351 such as a low noise amplifier, a mixer 352, a filter 353 such as a low pass filter, a downsampler 354, and a filter 355 such as an anti-aliasing filter. The mixer 352, the filter 353, and the downsampler 354 may collectively be part of an in-phase quadrature (I/Q) downconverter. The receiver 340 may further include an analog-to-digital converter (ADC). The digital back-end 361 may include a mixer 362, a resampler 363, a first in, first out (FIFO) component 364, and a deframer 365. Meanwhile, the radio front-end 370 may include a filter 371 such as a radiofrequency (RF) gain, an IQ upconverter 372, and a filter 373 such as an anti-imaging filter. The digital back-end 381 may include a mixer 382, a resampler 383, a FIFO component 384, and a deframer 385. The transmitter 390 may further include a digital to analog converter (DAC). Therefore, the engine 113 may translate the query 341 by identifying specific components, subcomponents, and any further divisions of the query 341, in order to comprehensively process the query 341.

In some examples, the engine 113 may determine any additional functionalities or resources, besides a software defined radio, to be cached based on environmental conditions. For example, during current or predicted inclement conditions (e.g., visibility of below a threshold level, and/or precipitation above a threshold level), the engine 113 may determine to additionally cache other functionalities or resources such as sensing features that would augment features of a software defined radio.

Figure 3B:
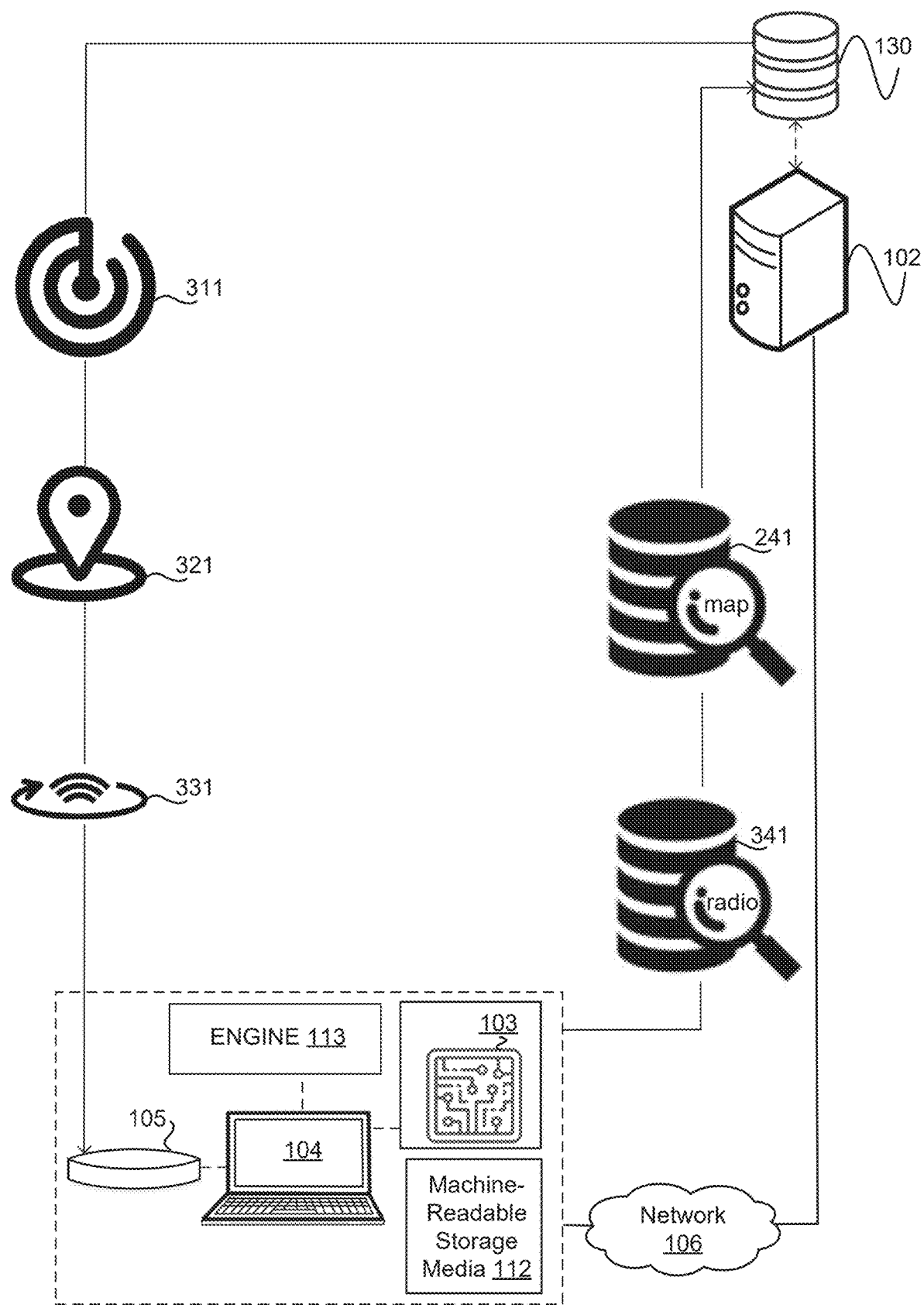
FIG. 3B illustrates an example implementation, in accordance with various examples, of a computing system that caches resources related to a software defined radio and a map.

FIG. 3B illustrates an exemplary implementation of a computing system that caches resources and/or functionalities in response to a combined query specifying a combination of entities, such as the query 341 specifying a software defined radio simultaneous with the query 241 specifying a map. In addition to the engine 113 processing the query 241 according to FIG. 2 and the query 341 according to FIG. 3A, the engine 113 may additionally cache any functionalities or resources that are associated with, or correspond to, a combination of the two queries, but may not correspond to a single query by itself. In other words, these functionalities may be triggered by or relevant to situations in which a map and a software defined radio are both actively being accessed or utilized, but not when only a map without a software defined radio, or only a software defined radio without a map is being accessed or utilized. In particular, the query 341 specifying a software defined radio simultaneous with the query 241 specifying a map may imply, suggest, or demonstrate that the computing device 104 is planning to perform, or is performing, additional sensing features or functionalities, for example, according to historical or previous deployments that involve a map and a radio. These sensing features may include a radar 311, a Global Positioning System (GPS) 321, and/or a Lidar 331. Therefore, the engine 113 may semantically infer, from a combination of entities within a query, whether additional functionalities or resources should be triggered or activated.

Figure 4:
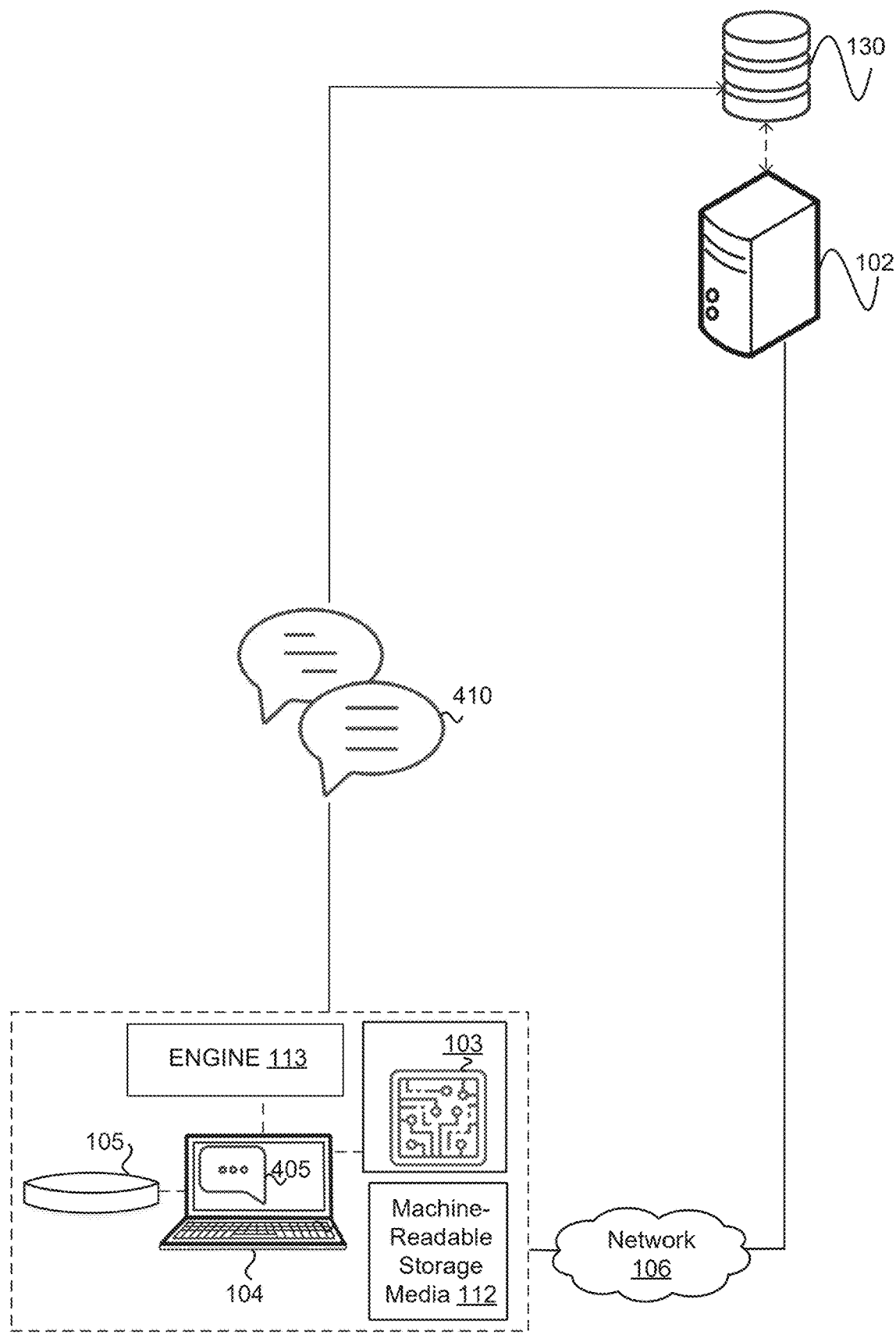
FIG. 4 illustrates an example implementation, in accordance with various examples, of a computing system that caches chat features and queues chat logs to be uploaded to a remote server.

FIG. 4 illustrates an exemplary implementation of a computing system that caches a communication application 405 such as a chat application, which, for example, has offline chat capabilities and can establish a queue 410 for any messages or data to be written back, or uploaded, into the server 130 upon a connection or a reconnection to the server. The communication application 405 may be stand-alone, or integrated or otherwise linked to any functionality, such as a map or a radio, described in preceding FIGS. 2, 3A, and 3B.

Figure 5:
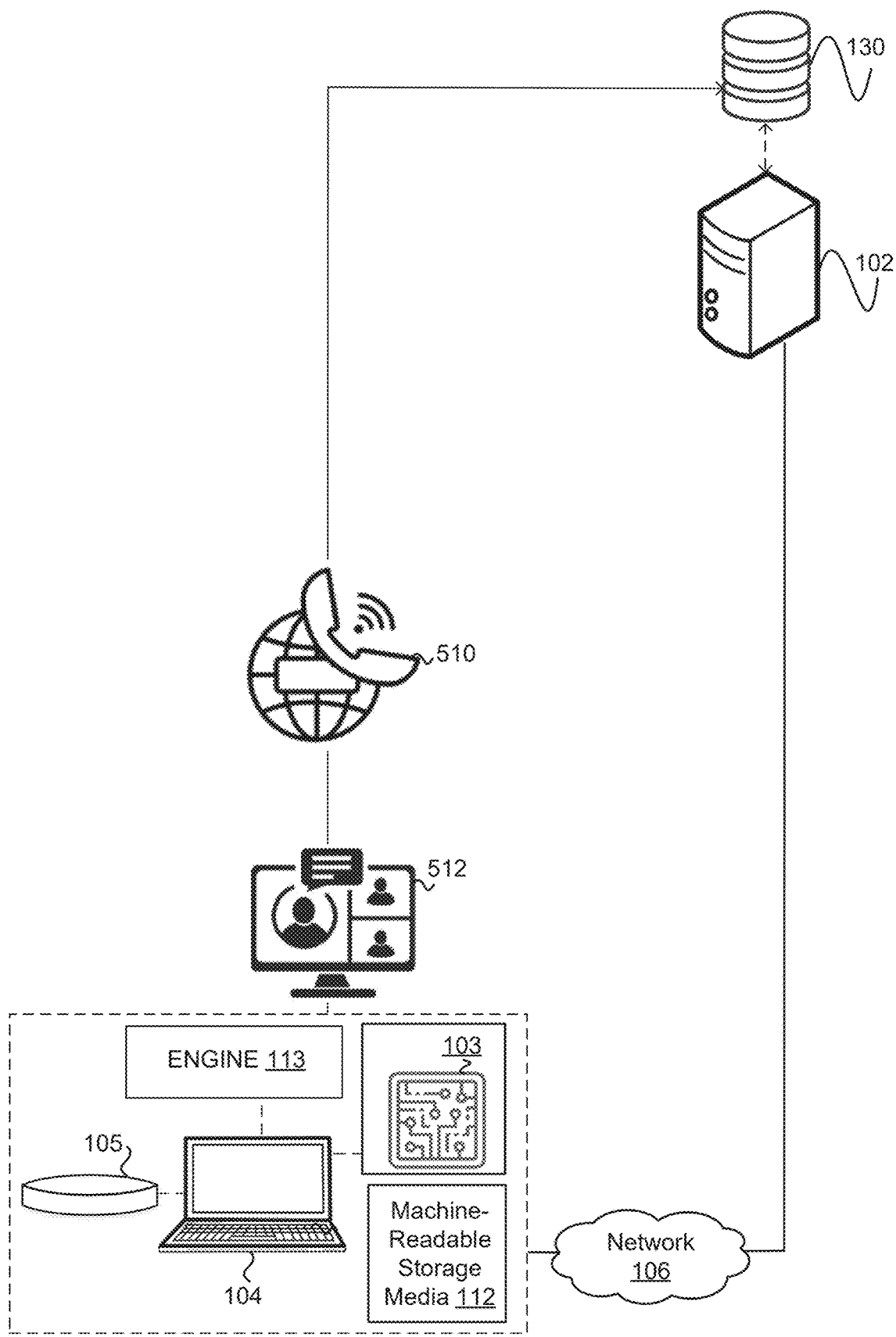
FIG. 5 illustrates an example implementation, in accordance with various examples, of a computing system that caches video and audio conferencing features.

FIG. 5 illustrates an exemplary implementation of a computing system that caches one or more communication applications such as a teleconferencing application 510 (e.g., Voice over Internet Protocol (IP) and/or a videoconferencing application 512 (e.g., Secure Video Teleconference (SVTC)). For example, these communication applications may permit a limited threshold amount of traffic, and/or may be active for some threshold duration or period of time, to conserve bandwidth.

Figure 6:
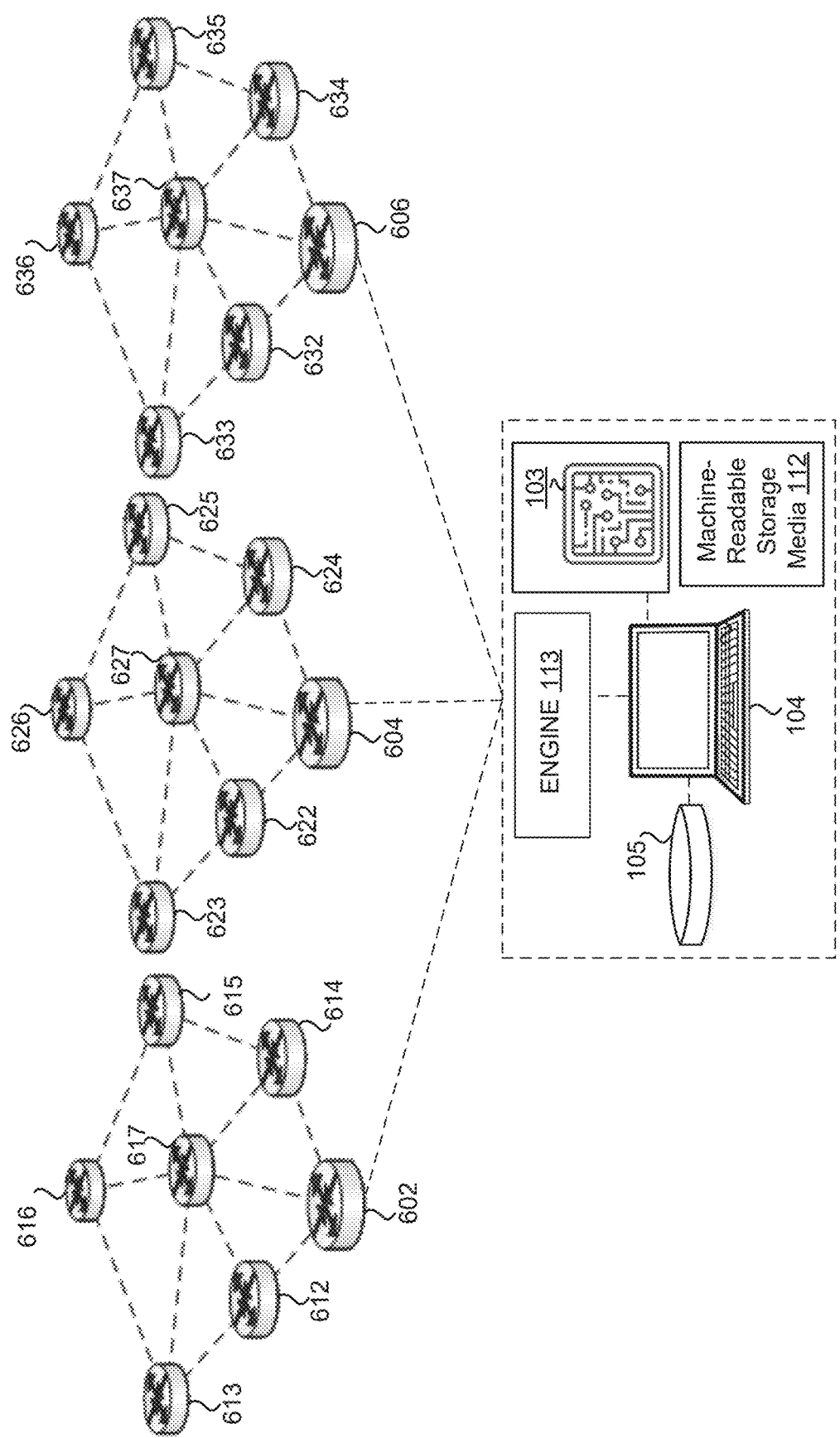
FIG. 6 illustrates an example implementation, in accordance with various examples, of a computing system that routes a query to a mesh network.

In some examples, unlike in FIGS. 1, 2, 3A, 3B, 4, and 5, in which the computing device 104 caches functionalities or resources from a single server, in some examples, the computing device 104 may retrieve or cache functionalities or resources from a partial or full mesh network, or a distributed network. For example, in FIG. 6, a mesh network may include nodes 612-617, 622-627, and 632-637, and gateways 602, 604, and 606, which access different networks. In some examples, the engine 113 may broadcast, to any or all of the gateways 602, 604, and 606, an indication of functionalities, resources, or bundles to be cached, and receive an indication from the gateway 602, 604, or 606, to retrieve the functionalities, resources, or bundles, or a subset thereof, from one or more nodes within that network. Alternatively, the engine 113 may determine or predict a particular network, and a particular gateway 602, 604, or 606 from which to retrieve functionalities, resources, or bundles, and route a query to that particular gateway. For example, the engine 113 may retrieve, from a table or index, a mapping of which particular nodes or gateways store, or have previously stored, certain functionalities, resources, or bundles. This mapping may be located, for example, in the storage 105.

Figure 7:
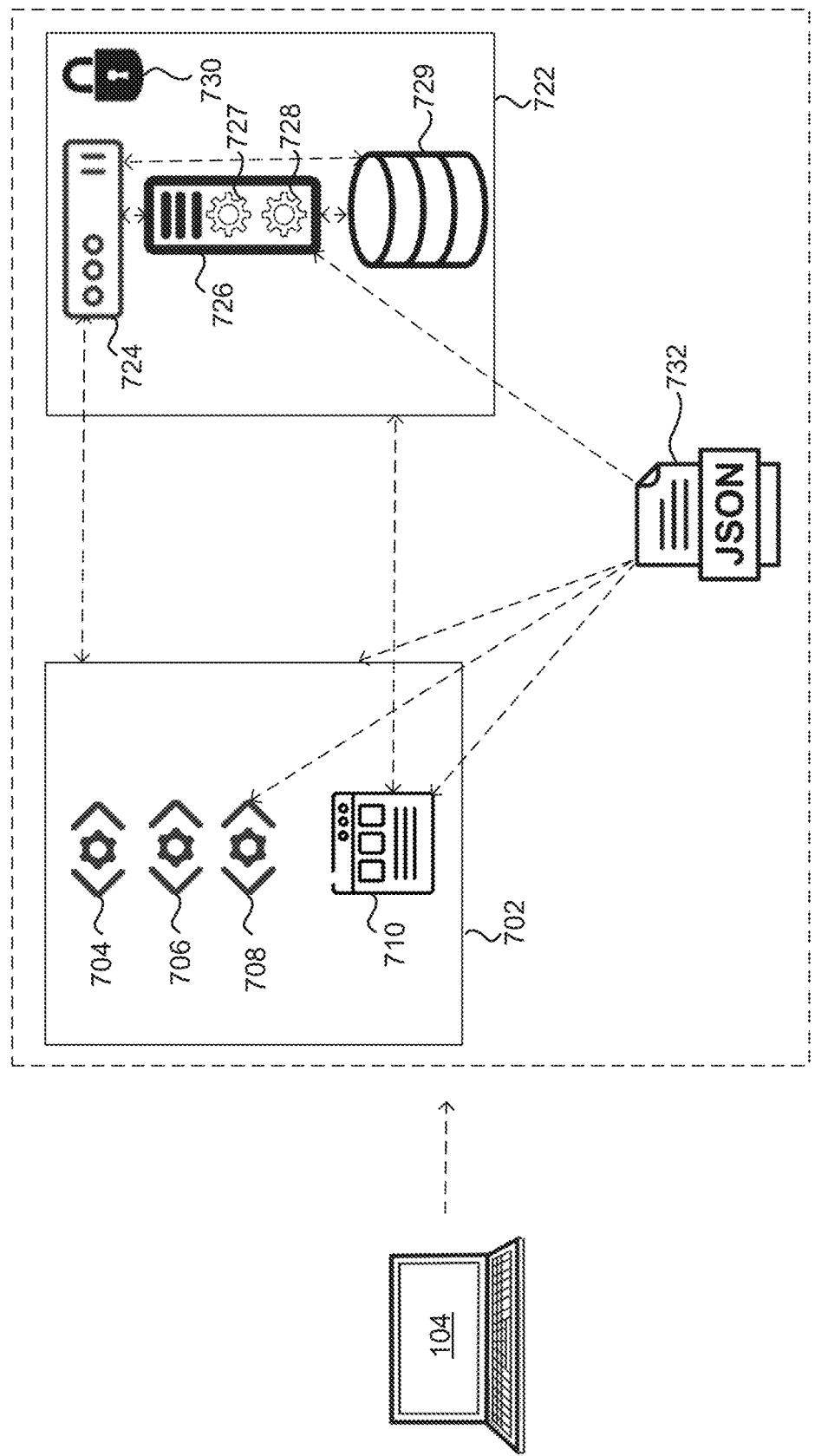
FIGS. 7-8 illustrate example implementations, in accordance with various examples, of a computing infrastructure that performs selective caching from a remote server.

FIG. 7 illustrates an example implementation, in accordance with various examples, of a computing infrastructure that performs selective caching from a remote server. In FIG. 7, an application 702, such as a client application, may load and/or render one or more functionalities or features such as one or more web applications 704, 706, and 708, and/or an interface 710. The web applications 704, 706, and 708 may include, or be linked to, static universal resource locators (URLs) to cache data from the server 130. The interface 710 may indicate progress of caching, any write modifications, for example, manifested in a list format, while disconnected from the server 130, and a status of writing back to the server 130 upon reconnection, including whether the writing back was successful and one or more times at which the write modifications were written back to the server 130. A module 732, which may include a JavaScript Object Notation (JSON) module, may communicate with the application 702 regarding an identity of the module 732, and functions or functionalities of logical component 726, such as, map viewing or sensor data capture. The module 732 may be renderable or rendered in a manifestation such as pixels. The module 732 may isolate each logical component and each web application from one another.

An internal server 722 may include a proxy 724, the logical component 726 that includes logic 727 and/or 728, a storage 729 which may be implemented as the storage 105, and a security feature 730, which may, for example, enforce any access control attributes or parameters of any cached resources, and encrypt data within the storage 729 to maintain security. Each logical component (e.g., the logical component 726) may include logic to render and/or implement a particular functionality, such as a map, a software defined radio, or a communication mechanism. Each logical component may be programmed in, and support, both JavaScript and Java logic. Specifically, one logical component may correspond to a map, another logical component may correspond to a software defined radio, and yet another logical component may correspond to a communication mechanism. The proxy 724 may communicate between a remote server (e.g., the server 130), the storage 729, the module 732, and the logical component 726. One or more APIs may facilitate communication between the proxy 724 and the server 130, between the proxy 724 and the application 702, between the proxy 724 and the logical component 726, between the proxy and the storage 729, between the logical component 726 and the storage 729, between the logical component and the module 732, between the internal server 722 and the interface 710, between the module 732 and the application 702, and/or between the module 732 and the interface 710. Overall, the computing infrastructure of FIG. 7 addresses networking, security, and database concerns.

Figure 8:
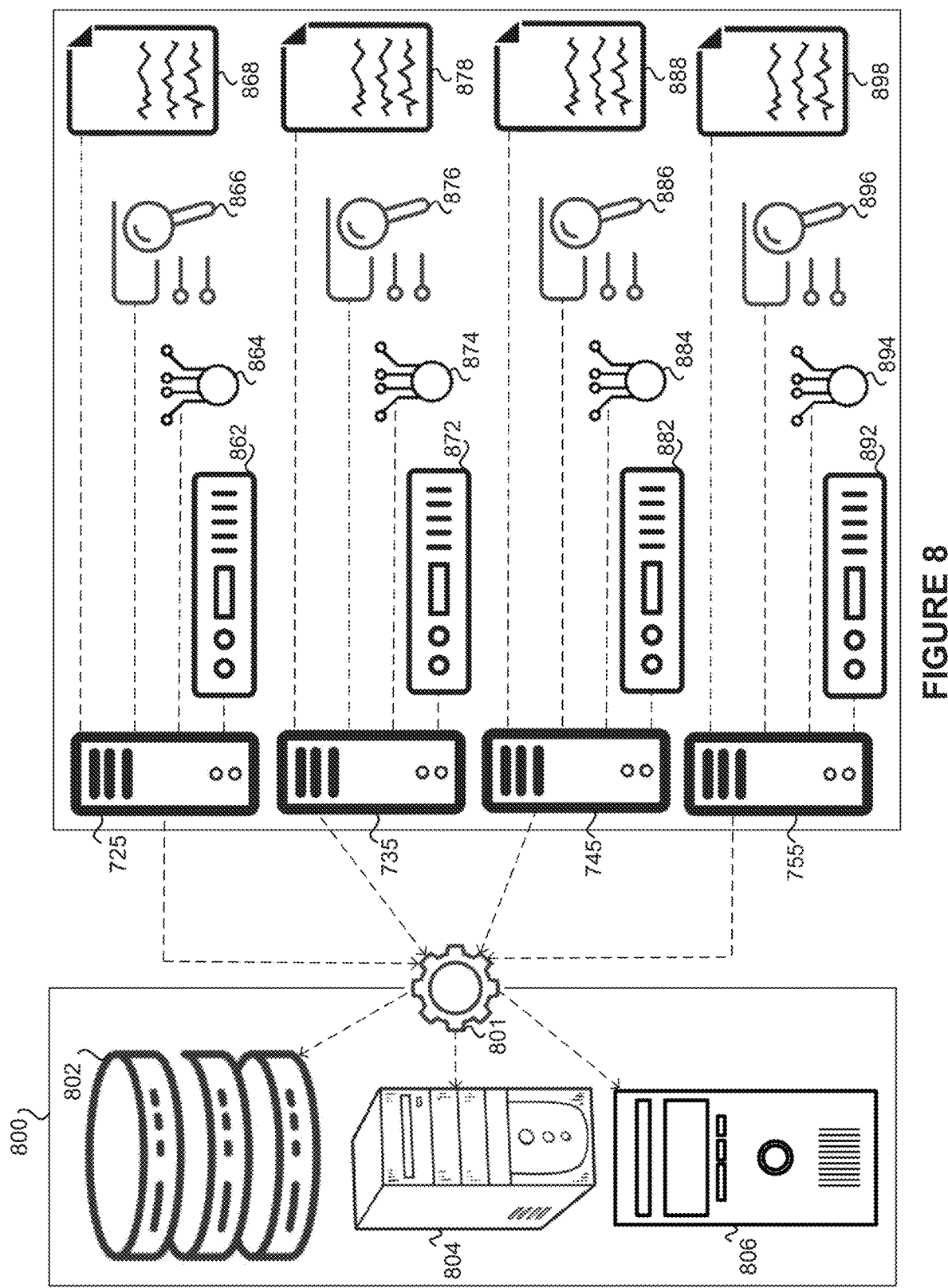

FIG. 8 illustrates an example implementation, in accordance with various examples, of a cluster upon which computing infrastructure that performs selective caching from a remote server. In particular, the logical component 726 may be included or implemented within a node (e.g., node 725, 735, 745, or 755) of the cluster. The cluster may include a control plane 800. The control plane 800 may perform tasks for nodes 725, 735, 745, and the node 755, such as scheduling, and responding to cluster events. Although four nodes are illustrated simply for the sake of illustration, a cluster may encompass any number of nodes. The control plane 800 may include an API server 801, which exposes APIs at a front end of the control plane 800. The control plane 800 may include a key-value store 802 for any data within the cluster, such as nodes within the cluster, tasks or applications being deployed within the nodes, and any malfunctions or issues with the nodes. The control plane 800 may include a scheduler 804 which schedules one or more tasks for workload performers within the nodes 725, 735, 745, and 755. The workload performers may perform jobs or tasks, and/or deploy or run applications. In some examples, additionally or alternatively, the scheduler 804 may assign workload performers to particular nodes. Criteria for scheduling and/or assigning workload performers may include, individual and collective resource constraints, hardware, software, policy, and/or security constraints, affinity and anti-affinity constraints, data locality, inter-workload interference, and scheduling deadlines. Affinity rules indicate that two workload performers that have a common label, or key-value pair, are to be placed on a common node, while anti-affinity rules indicate that two workload performers that have a common label, or key-value pair, are to be placed on different nodes. The control plane 800 may further include a manager 806, which responds to scenarios in which nodes malfunction or stop performing tasks, allocates workload performers upon detecting new tasks, and/or perform maintenance on the nodes.

Meanwhile, each of the nodes 725, 735, 745, and 755 may include an agent that checks for health of a node and outputs a flag or alert if any health parameters decrease below a threshold (e.g., as indicated by processing speed), a network proxy that regulates communications to networks within the cluster or outside the cluster and performs packet filtering, a monitor which monitors metrics regarding containers, such as processing attributes and/or any failures or issues, and a logging component that logs the metrics into a log store within the nodes. The node 725 includes a network proxy 862, an agent 864, a monitor 866, and a logging component 868. The node 735 includes a network proxy 872, an agent 874, a monitor 876, and a logging component 878. The node 745 includes a network proxy 882, an agent 884, a monitor 886, and a logging component 888. The node 755 includes a network proxy 892, an agent 894, a monitor 896, and a logging component 898.

Figure 9:
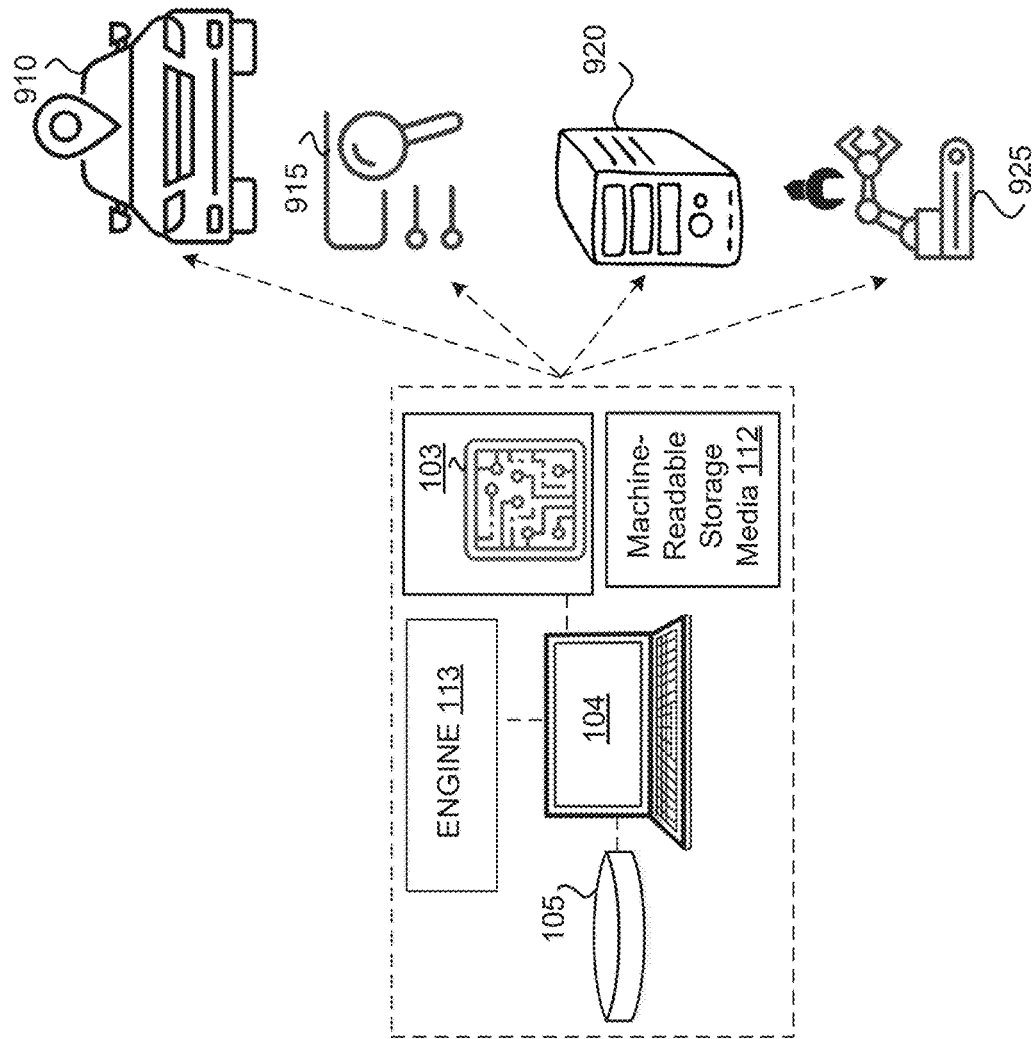
FIG. 9 illustrates example implementations, in accordance with various examples, of a computing infrastructure that performs downstream actions following the selective caching from a remote server.

FIG. 9 illustrates downstream actions that may be performed, following the engine 113 selectively caching one or more resources or functionalities, in association with any concepts illustrated with respect to any of FIGS. 1, 2, 3A, 3B, 4, 5, 6, 7, and 8. These downstream actions may include collecting additional information, alerting, transmitting or presenting information, calling another application programming interface (API) or webhook, analyzing data, writing data to the server 130 and/or to an external database, and/or performing a transformation or change on underlying data and/or a node associated with the underlying data. FIG. 9 illustrates exemplary downstream actions including performing, controlling, and/or coordinating some physical process such as navigation 910, monitoring 915, transmitting and/or writing information to a different computing system 920, and/or maintenance or other physical operations 925. The different computing system 920 may perform modification of data. The modification may encompass creating, editing, or removing entities or links, and/or adjusting attributes or parameters that are falling outside of an operating range or threshold, through some electronic or physical operation.

Figure 10:
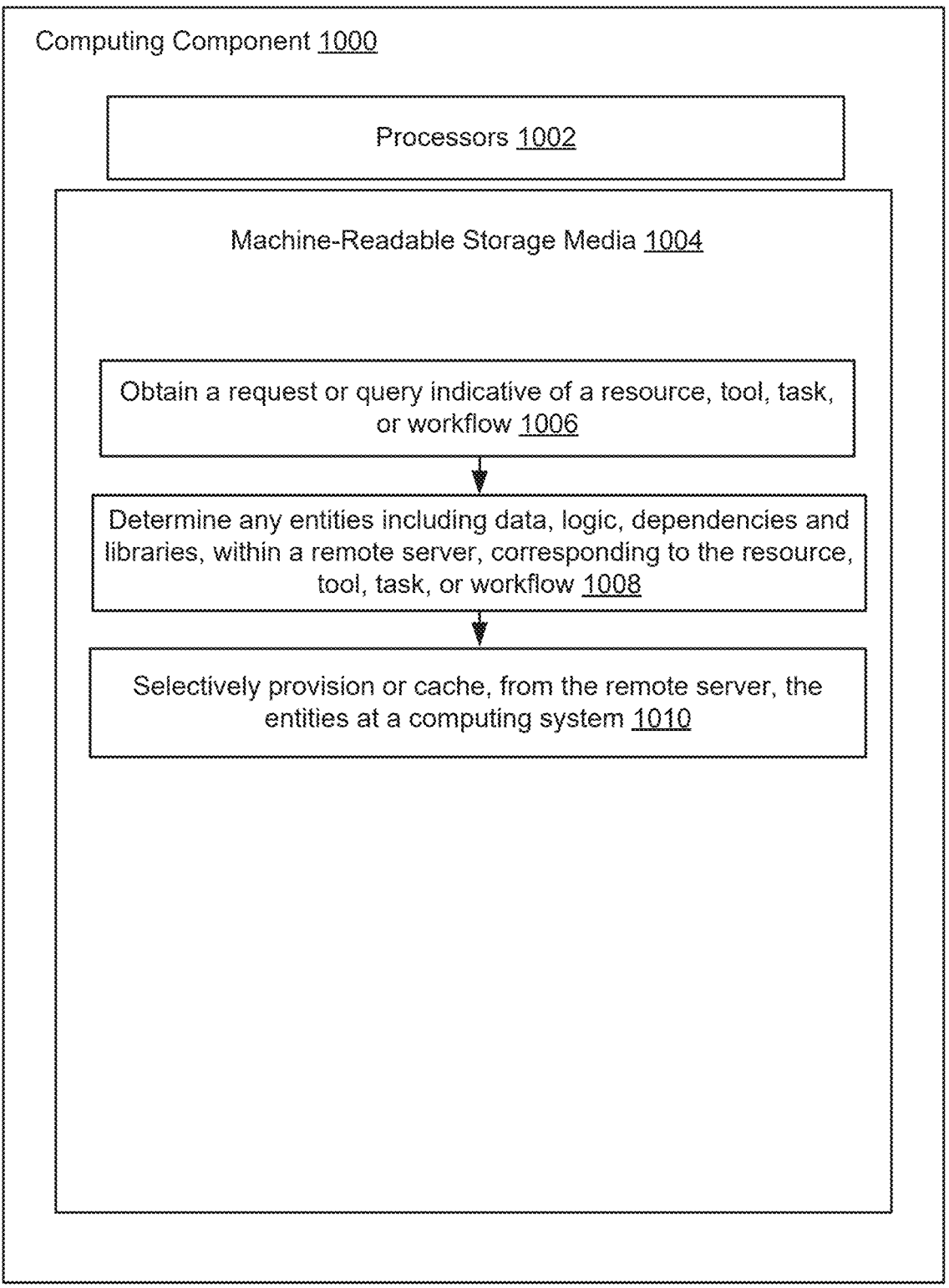
FIG. 10 illustrates a flowchart of an example method consistent with FIGS. 1, 2, 3A, 3B, 4, 5, 6, 7, 8 and 9, embodied in a computing component.

FIG. 10 illustrates a flowchart of an example method consistent with FIGS. 1, 2, 3A, 3B, 4, 5, 6, 7, 8 and 9, embodied in a computing component. FIG. 10 illustrates a computing component 1000 that includes one or more processors The computing component 1000 may be implemented as the computing device 104 of FIGS. 1, 2, 3A, 3B, 4, 5, 6, 7, and 9. The processors 1002 may be implemented as the processors 103 of FIGS. 1, 2, 3A, 3B, 4, 5, 6, and 9. The machine-readable storage media 1004 may be implemented as the machine-readable storage media 112 of FIGS. 1, 2, 3A, 3B, 4, 5, 6, and 9, and may include suitable machine-readable storage media described in FIG. 11.

At step 1006, the processor(s) 1002 may execute machine-readable/machine-executable instructions stored in the machine-readable storage media 904 to obtain a request or query (e.g., the query 141, 241, or 341 in FIG. 1, 2, or 3A respectively, a combination of the query 241 and 341 in FIG. 3B, or a query for a chat or other communication functionality in FIGS. 4 and 5), indicative of a resource, tool, task, or workflow.

At step 1008, the processor(s) 1002 may execute machine-readable/machine-executable instructions stored in the machine-readable storage media 1004 to determine any entities including data, logic, dependencies and libraries, within a remote server (e.g., the server 130), corresponding to the resource, tool, task, or workflow.

At step 1010, the processor(s) 1002 may execute machine-readable/machine-executable instructions stored in the machine-readable storage media 1004 to selectively provision or cache, from the remote server, the entities at the computing component 1000 (e.g., at a storage 105 of the computing component 1000). Thus, by selectively caching relevant functionalities or resources locally at the computing component 1000, the computing component 900 would still be able to perform computing tasks even when a network connection to the remote server is unavailable, while not being overloaded by an excessive storage footprint.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 11:
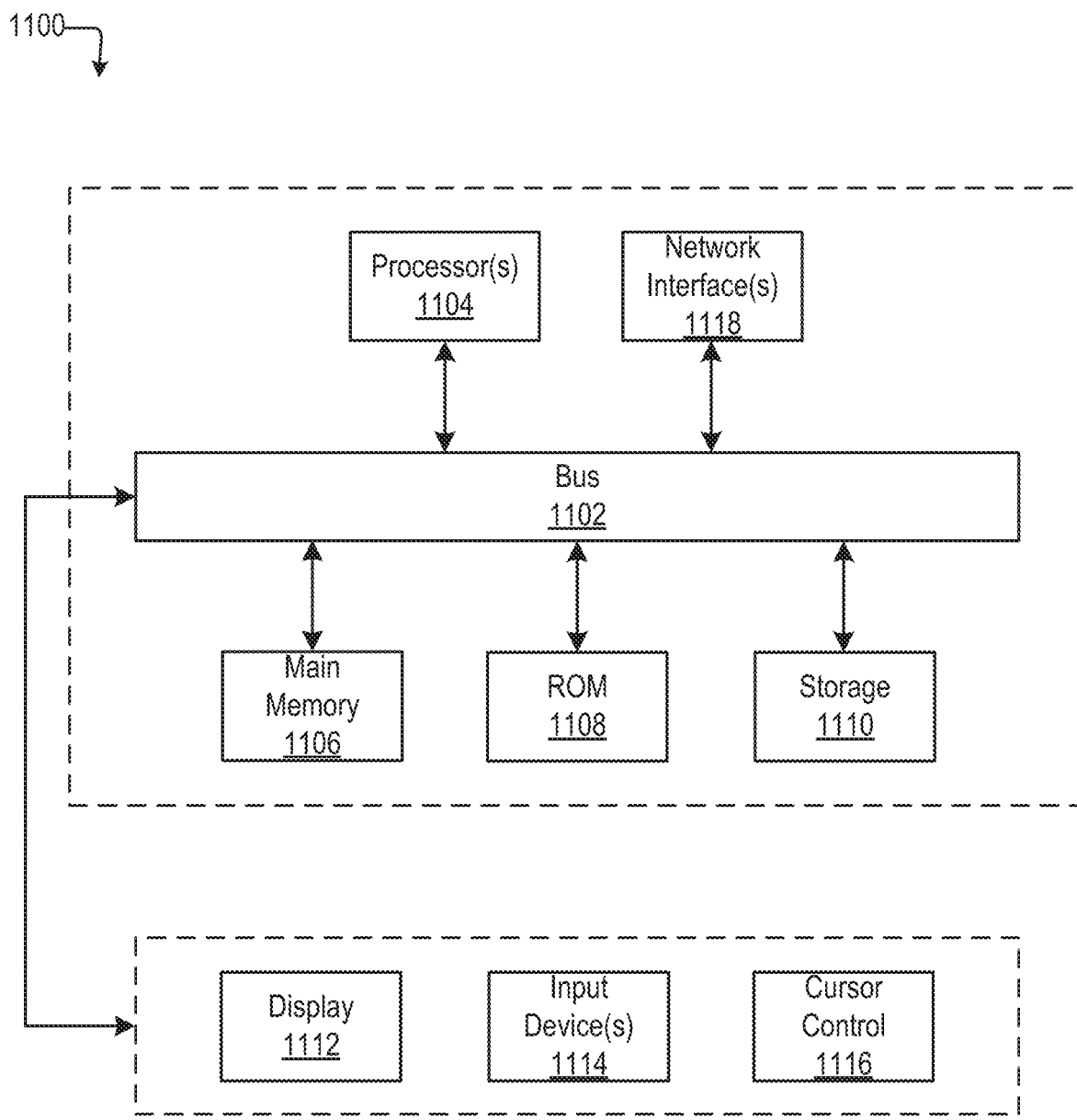
FIG. 11 illustrates a block diagram of an example computer system in which any of the embodiments described herein may be implemented.

FIG. 11 is a block diagram that illustrates a computer system 1100 upon which any of the embodiments described herein may be implemented. In some examples, the computer system 1100 may include a cloud-based or remote computing system. For example, the computer system 1100 may include a cluster of machines orchestrated as a parallel processing infrastructure. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a cathode ray tube (CRT) or LCD display (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may retrieves and executes the instructions. The instructions received by main memory 1106 may optionally be stored on storage device 1110 either before or after execution by processor 1104.

The computer system 1100 also includes a communication interface 1118 coupled to bus 1102. Communication interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any figure or example can be combined with one or more features of any other figure or example. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to an "example" or "examples" means that a particular feature, structure or characteristic described in connection with the example is included in at least one example of the present invention. Thus, the appearances of the phrases "in one example" or "in some examples" in various places throughout this specification are not necessarily all referring to the same examples, but may be in some instances. Furthermore, the particular features, structures, or characteristics may be combined in any suitable manner in one or more different examples.

The invention claimed is:

1. A computing system, comprising:
one or more processors; and
memory storing instructions that, when executed by the one or more processors, cause the computing system to perform:
obtaining a request or query indicative of a resource, tool, task, or workflow;
determining any entities including data, logic, dependencies and libraries, within a remote server, corresponding to the resource, tool, task, or workflow; and
caching, from the remote server, the any entities at the computing system; and
setting an access control level of each of the cached any entities equivalent to an access control level at which the cached any entities were retrieved from the remote server, wherein setting the access control level comprises:
retrieving two entities of the cached any entities at a common access control level different from an actual access control level of one of the cached any entities stored within the remote server; and
setting the access control level of the two retrieved entities equivalent to the common access control level.

2. The computing system of claim 1, wherein the determining of any entities comprises mapping, according to a semantic translation, the resource, tool, task, or workflow to any data, logic, dependencies, and libraries.

3. The computing system of claim 1, wherein the determining of any entities is based on a historical frequency of utilization of any entities related to the resource, tool, task, or workflow.

4. The computing system of claim 1, wherein the data comprises a data object, the logic comprises ontology or configuration features to render the data, and the logic comprises front-end assets.

5. The computing system of claim 1, the caching the any entities comprises storing the any entities for a threshold period of time at the computing system and deleting or removing the any entities following the threshold period of time.

6. The computing system of claim 1, wherein the instructions further cause the computing system to perform:
detecting a network disconnection within the computing system;
receiving any modifications to the data; and
in response to detecting the network disconnection, queueing the any modifications to the data to be uploaded to the remote server upon a network reconnection.

7. The computing system of claim 6, wherein the instructions further cause the computing system to perform:
upon the network reconnection, selectively updating a vector clock of the remote server, indicating a most recent revision prior to the network disconnection, if the vector clock of the remote server represents an earlier time compared to a vector clock of the computing system indicating a write operation at the computing system during the network disconnection.

8. The computing system of claim 1, wherein the entities comprise front-end entities and exclude back-end entities, the front-end entities comprising processed or transformed data from an original data source.

9. A computer-implemented method of a computing system, the computer-implemented method comprising:
obtaining a request or query indicative of a resource, tool, task, or workflow;
determining any entities including data, logic, dependencies and libraries, within a remote server, corresponding to the resource, tool, task, or workflow;
caching, from the remote server, the any entities at the computing system; and
setting an access control level of each of the cached any entities equivalent to an access control level at which the cached any entities were retrieved from the remote server, wherein setting the access control level comprises:
retrieving two entities of the cached any entities at a common access control level different from an actual access control level of one of the cached any entities stored within the remote server; and
setting the access control level of the two retrieved entities equivalent to the common access control level.

10. The computer-implemented method of claim 9, wherein the determining of any entities comprises mapping, according to a semantic translation, the resource, tool, task, or workflow to any data, logic, dependencies, and libraries.

11. The computer-implemented method of claim 9, wherein the determining of any entities is based on a historical frequency of utilization of any entities related to the resource, tool, task, or workflow.

12. The computer-implemented method of claim 9, wherein the data comprises a data object, the logic comprises ontology or configuration features to render the data, and the logic comprises front-end assets.

13. The computer-implemented method of claim 9, wherein the caching the any entities comprises storing the any entities for a threshold period of time at the computing system and deleting or removing the any entities following the threshold period of time.

14. The computer-implemented method of claim 9, further comprising:
  detecting a network disconnection within the computing system;
  receiving any modifications to the data; and
  in response to detecting the network disconnection, queueing the any modifications to the data to be uploaded to the remote server upon a network reconnection.

15. The computer-implemented method of claim 9, further comprising, upon the network reconnection, selectively updating a vector clock of the remote server, indicating a most recent revision prior to the network disconnection, if the vector clock of the remote server represents an earlier time compared to a vector clock of the computing system indicating a write operation at the computing system during the network disconnection.

16. The computer-implemented method of claim 9, wherein the entities comprise front-end entities and exclude back-end entities, the front-end entities comprising processed or transformed data from an original data source.

17. A computing system, comprising:
one or more processors; and
memory storing instructions that, when executed by the one or more processors, cause the computing system to perform:
  obtaining a request or query indicative of a resource, tool, task, or workflow;
  determining any entities including data, logic, dependencies and libraries, within a remote server, corresponding to the resource, tool, task, or workflow; and
  caching, from the remote server, the any entities at the computing system;
  detecting a network disconnection between the computing system and the remote server;
  receiving any modifications to the any entities at the computing system; and
  in response to detecting the network disconnection, queueing any uploads to the remote server according to the any modifications upon a network reconnection; and
  upon the network reconnection, selectively updating a vector clock of the remote server, indicating a most recent revision prior to the network disconnection, if the vector clock of the remote server represents an earlier time compared to a vector clock of the computing system indicating at least a modification to any cached entity at the computing system during the network disconnection.

* * * * *